No. 885,037. PATENTED APR. 21, 1908.
E. S. GLOVER.
PERCOLATOR.
APPLICATION FILED JULY 9, 1907.
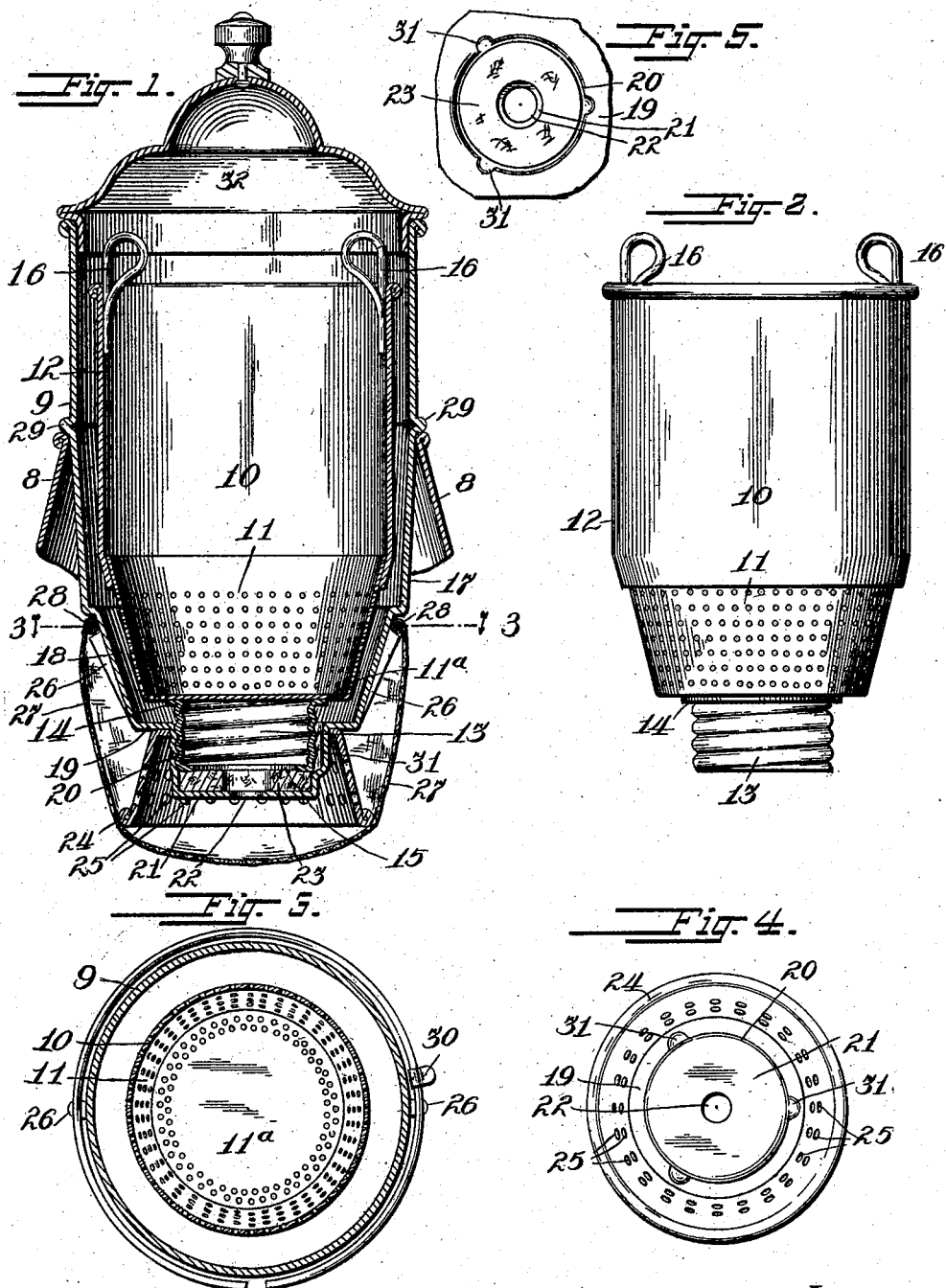
Witnesses
Milton Lenoir
Frank F. Elores
Inventor
Eli S. Glover
By Clarence W Taylor
Attorney.

UNITED STATES PATENT OFFICE.

ELI S. GLOVER, OF CHICAGO, ILLINOIS.

PERCOLATOR.

No. 885,037.　　　Specification of Letters Patent.　　　Patented April 21, 1908.

Application filed July 9, 1907. Serial No. 382,893.

*To all whom it may concern:*

Be it known that I, ELI S. GLOVER, a citizen of the United States, residing at Chicago, in the county of Cook and State of Illinois, have invented certain new and useful Improvements in Percolators, of which the following is a specification.

My invention relates to an improvement in percolators, and the objects of my improvement are, first, to provide simple and effective means to time and control the flow of an infusion from the percolator; and, second, the provision of a practical device of the class of few parts easily cleansed and at comparatively low initial cost.

With the above and other objects in view, this invention consists in the novel features and in the combination and arrangement of parts hereinafter more specifically described, illustrated in the drawings, and particularly pointed out in the claims hereunto appended.

In describing the invention in detail reference is had to the accompanying drawings forming a part of this specification wherein like numerals of reference indicate corresponding parts throughout the several views, and in which Figure 1 is a vertical central section with the parts assembled. Fig. 2 is a side elevation of the filtering cup. Fig. 3 is a section on line 3—3 of Fig. 1. Fig. 4 is an inverted plan view. Fig. 5 is a detail view of the recesses and disk of the screw down valve.

One embodiment of my invention, in its more narrow aspects, will now be described.

The reference numeral 8 represents a fluid receptacle, or coffee-pot, and the percolator proper comprises a filter holder 9, and a filter cup 10. The upper portion 12, of the cup 10, is imperforate and has no cover, but is provided with ears 16, for the purposes of rotating the cup and for handling. The lower portion 11, of the cup is perforated, excepting the portion of the bottom indicated by 11ª in Fig. 3. On the bottom of the cup is a male threaded collar 13, with an annular flange 14, and an internal annular flange 15. Preferably the collar is made separately and soldered to the bottom, but it may be made integral therewith or in any suitable or desired manner. The filter holder 9 has an external annular bead 29 to rest upon the top of receptacle 8, tapering lower portion 17, cup-shaped bottom 18, screw threaded extension 20, annular flange 21, port 22, and recesses 31. For the purpose of more certainly securing a water tight engagement of the members 13 and 20, what I term a screw down valve, I provide a non-metallic apertured disk 23 of cork. If desired this disk may be omitted. The outwardly flaring bottom 24 has a series of perforations 25 to permit a wider distribution of the fluid that may readily pass through the clarifying or textile strainer 27, and to admit air to pass therethrough. On the outside of the cup-shaped portion 18 is provided lugs 26, oppositely positioned. The clarifying strainer is hemmed at the top and a split ring 28, inserted therein in the usual manner, as shown in Fig. 1. The handle 30, shown in Fig. 3, is useful in putting on and taking off the textile strainer. The ordinary cover 32 is provided for the holder 9.

It will be obvious that the space between the holder 9, and the cup 10, and the recess 31, port 22, and perforation 25, will permit a free action of gravity in the movement of the fluid when collar 13 is unscrewed somewhat and thus its lower end raised from the disk 23.

To dispense with the use of egg or other clarifying means I employ a textile strainer in addition to the filter cup.

In operation the cup is inserted in the holder and rotated by means of the ears 16, to seat the threaded collar on the disk and thus close the valve. For example, the requisite amount of coffee, pulverized or ground, may then be placed in the filter cup and the cup filled about half full of hot water, and after standing about three minutes the cup may be given an unturning movement sufficient to permit the fluid to pass down the recesses through the port into the coffee-pot; then sufficient additional hot water may be poured into the cup and allowed to run through making the desired quantity of coffee.

Manifestly changes in the form and arrangement of parts may be resorted to without departing from the spirit and scope of my invention. Therefore, I do not wish to be limited to the exact construction shown and described in the preferred form of my improvement.

Having thus fully described my invention, what I claim as new, and desire to secure by Letters-Patent, is

1. A percolator comprising a filter holder having a screw threaded extension on the bottom thereof with a port therein, a perforated filter cup disposed above the bottom of the holder and having a threaded collar on the bottom thereof, the bottom of the cup being imperforate within the threaded portion, said collar being adapted to engage the extension to control the outflow of fluid from the percolator.

2. A percolator comprising a filter holder having a screw threaded extension with a port therein, an apertured disk normally seated on the bottom of the extension, a perforated filter cup of less cross section than the holder and being imperforate within the threaded portion and having a threaded collar adapted to seat on the disk to prevent the out flow of fluid.

3. A percolator comprising a filter holder having a threaded extension of the bottom thereof with a recess and a port to permit the out flow of fluid, a non-metallic apertured disk, a filter cup with its upper portion imperforate and its lower portion perforated and carrying a threaded collar the bottom of the filter cup being imperforate within the threaded portion and adapted to engage said extension to time and control the flow of an infusion from the percolator.

4. A percolator comprising a filter holder having a threaded extension of the bottom thereof and a recess in the extension to permit the out flow of fluid, a perforated filter cup having a threaded collar on the bottom thereof with an internal annular flange, the bottom of the filter cup being imperforate within the threaded portion and a non-metallic apertured disk.

5. A percolator comprising a filter holder having a threaded extension with a port and a plurality of recesses to permit out flow of fluid, a non-metallic apertured disk, a perforated filter cup having a threaded collar on the bottom thereof, the bottom of the filter cup being imperforate within the threaded portion, and adapted to engage said extension to control the out flow of fluid from the percolator.

In testimony whereof I affix my signature in presence of two witnesses.

ELI S. GLOVER.

Witnesses:
   S. ELVA KELLOGG,
   WALTER WAGNER.